United States Patent
Osan et al.

(10) Patent No.: US 6,593,452 B2
(45) Date of Patent: Jul. 15, 2003

(54) FIBERS MADE OF CYCLOOLEFIN COPOLYMERS

(75) Inventors: Frank Osan, Kelkheim (DE); Michael-Joachim Brekner, Frankfurt am Main (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 10/152,301

(22) Filed: May 21, 2002

(65) Prior Publication Data

US 2003/0045656 A1 Mar. 6, 2003

Related U.S. Application Data

(62) Division of application No. 08/456,373, filed on Jun. 1, 1995, now Pat. No. 6,458,919, which is a continuation of application No. 08/195,918, filed on Feb. 10, 1994, now abandoned.

(30) Foreign Application Priority Data

Feb. 12, 1993 (DE) .......................... 43 04 317

(51) Int. Cl.⁷ .............. C08F 6/08; C08F 6/16; C08F 6/28; C08F 32/08
(52) U.S. Cl. ............... 528/495; 526/281; 528/480; 528/491; 528/499
(58) Field of Search .............. 528/480, 491, 528/495, 499; 526/281

(56) References Cited

U.S. PATENT DOCUMENTS

| | | | |
|---|---|---|---|
| 3,891,610 A | 6/1975 | Fowells | |
| 3,971,767 A | 7/1976 | Setterquist | 526/65 |
| 4,184,987 A | 1/1980 | Karayannis et al. | |
| 4,476,297 A | 10/1984 | Kablitz et al. | 528/486 |
| 5,023,223 A | 6/1991 | Ebara et al. | 502/116 |
| 5,087,677 A | 2/1992 | Brekner et al. | 526/160 |
| 5,432,242 A | 7/1995 | Baron | 526/68 |
| 6,458,919 B1 * | 10/2002 | Osan | 528/480 |

FOREIGN PATENT DOCUMENTS

| | | |
|---|---|---|
| AU | 11465/92 | 9/1992 |
| AU | 641 291 | 9/1993 |
| EP | 0 485 893 | 5/1992 |
| EP | 0 503 422 | 9/1992 |
| WO | WO 92/14766 | 9/1992 |

* cited by examiner

Primary Examiner—Fred Zitomer
(74) Attorney, Agent, or Firm—Connolly Bove Lodge & Hutz LLP

(57) ABSTRACT

The present invention relates to a fiber which comprises at least one partly crystalline cycloolefin copolymer which can be prepared by polymerization of a symmetrical polycyclic olefin, an acyclic olefin and, if desired, a monocyclic olefin in the presence of a catalyst system comprising an aluminoxane and a metallocene compound of the formula

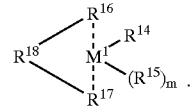

33 Claims, No Drawings

FIBERS MADE OF CYCLOOLEFIN COPOLYMERS

RELATED APPLICATIONS

This application is a divisional application of Ser. No. 08/456,373 filed Jun. 1, 1995, U.S. Pat. No. 6,458,919, which is a continuation of Ser. No. 08/195,918 filed Feb. 10, 1994, ABN.

The invention relates to fibers made of partly crystalline copolymers of polycyclic olefins.

Polyolefin fibers based on polyethylene and polypropylene are already known. A very advantageous property of these polyolefin fibers is their high solvent resistance. They are essentially stable to all polar solvents (for example ketones, alcohols, organic acids, ester compounds, amide compounds) and aqueous media (for example aqueous acids, alkalis), and at room temperature are also resistant to non-polar solvents such as saturated hydrocarbons (for example oils, petroleum fractions). This property, combined with a high chemical resistance, has given the polyolefin fibers wide areas of application in the textile sector and in industry. Highly oriented fibers made of high-molecular-weight PE are known for their very high tensile strength at room temperature. PE and PP fibers are also used for the manufacture of woven fabrics and nonwovens.

The thermal shape stability, for example in connection with the sterilizability or other processes in which higher temperatures occur (for example, nonwovens for filtering of hot water and gas), frequently plays an important role here. Unfavorably, the mechanical properties of PE fibers begin to fall off only just above room temperature. A significant deterioration is observed above about 70 to 80° C.

Cycloolefin copolymers incorporating a high proportion of cycloolefin and also cycloolefin homopolymers have, because of their high glass transition temperature, very high thermal shape stability and hence good mechanical properties. Furthermore, they have outstanding resistance to polar solvents such as water, alcohol, acetone and dimethylformamide, and also to aqueous acids and alkalis. However, on the unfavorable side, they dissolve readily in aliphatic and aromatic hydrocarbons or they are greatly swollen by these.

It is an object of the invention to provide polyolefin fibers which are comparable with polyethylene and polypropylene fibers in respect of their solvent resistance and at the same time have a higher thermal shape stability than these known polyolefin fibers and can be spun from the melt.

It has been found that this object can be achieved by fibers made of partly crystalline cycloolefin copolymers which contain less than 100 ppm (based on the total weight of the polymer) of catalyst residues.

The preparation of partly crystalline cycloolefin copolymers is described in EP-A-0 503 422. Tests have shown that the polymers thus prepared contain above 100 ppm of catalyst residues (i.e. metallocene and cocatalyst residues). During processing via the melt (at about 300° C.) these products prove to be thermally labile. This is shown by the polymer turning brown. Thin pressed plates (thickness 200 μm) showed distinct gel particles (fish eyes) which probably arose through localized crosslinking of the polymer, triggered by catalyst residues. Spinning tests on fibers produced in accordance with EP-A 503 422 gave unsatisfactory results, since the gel particles led to fiber breakage. It was established that such cycloolefin polymers are only suitable for fiber production if the residual catalyst content is less than 100 ppm.

Cycloolefins polymerize in bulk or in solvents in the presence of metallocene catalysts with retention of the rings (EP 407870, DE 84036264). The solvents used are mainly hydrocarbons.

The invention accordingly provides fibers which comprise at least one cycloolefin copolymer which can be prepared by polymerization of from 30 to 99.9% by weight, based on the total amount of monomers, of at least one symmetrical, polycyclic olefin of the formula I, II, III, IV, V or VI

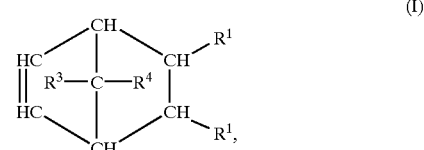

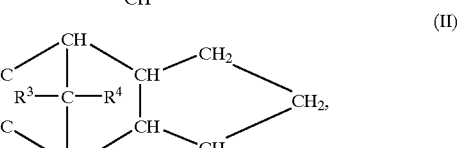

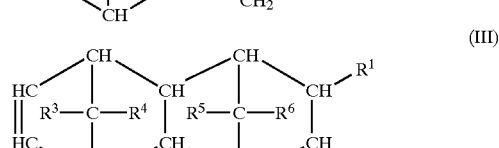

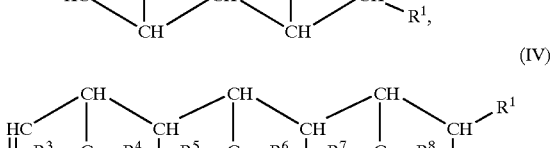

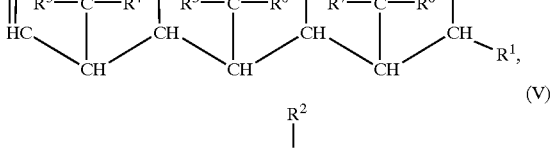

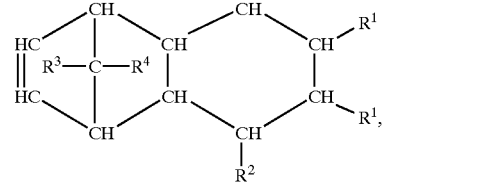

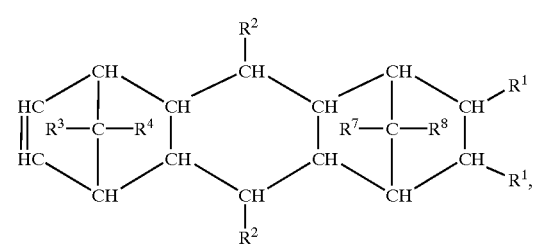

in which $R^1$, $R^2$, $R^3$, $R^4$, $R^5$, $R^6$, $R^7$ and $R^8$ are identical or different and are a hydrogen atom, a $C_6$–$C_{16}$-aryl or a $C_1$–$C_8$-alkyl radical, from 0 to 50% by weight, based on the total amount of monomers, of a monocyclic olefin of the formula VII

 (VII)

in which n is a number from 2 to 10, and from 70 to 0.1% by weight, based on the total amount of monomers, of at least one acyclic olefin of the formula VIII

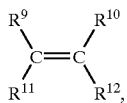 (VIII)

in which $R^9$, $R^{10}$, $R^{11}$ and $R^{12}$ are identical or different and are a hydrogen atom or a $C_1$–$C_8$-alkyl radical or a $C_6$–$C_{16}$-aryl radical, at temperatures from −78 to 150° C. and a pressure from 0.01 to 64 bar, in the presence of a catalyst which comprises an aluminoxane of the formula IX

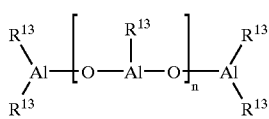 (IX)

for the linear type and/or of the formula X

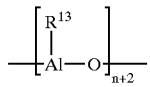 (X)

for the cyclic type, where in the formulae IX and X the radicals $R^{13}$ are identical or different and are a ($C_1$–$C_6$)-alkyl group or phenyl or benzyl and n is an integer from 0 to 50, and a metallocene of the formula XI

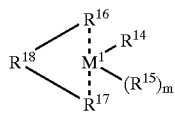 (XI)

in which $M^1$ is titanium, zirconium, hafnium, vanadium, niobium or tantalum, $R^{14}$ and $R^{15}$ are identical or different and are a hydrogen atom, a halogen atom, a ($C_1$–$C_{10}$)-alkyl group, a ($C_1$–$C_{10}$)-alkoxy group, ($C_6$–$C_{10}$)-aryl group, a ($C_6$–$C_{10}$)-aryloxy group, a ($C_2$–$C_{10}$)-alkenyl group, a ($C_7$–$C_{40}$)-arylalkyl group, a ($C_7$–$C_{40}$)-alkylaryl group or a ($C_8$–$C_{40}$)-arylalkenyl group, m=1 or 2, $R^{16}$ and $R^{17}$ are different and are a monocyclic or polycyclic hydrocarbon radical which can form a sandwich structure with the central atom $M^1$ where the part of the molecule formed by $R^{16}$, $R^{17}$ and $M^1$ has $C_1$ symmetry, $R^{18}$ is

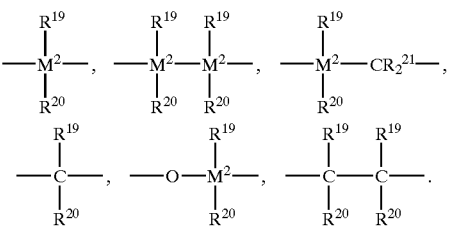

$=BR^{19}$, $=AlR^{19}$, —Ge—, —Sn—, —O—, —S—, $=SO$, $=SO_2$, $=NR^{19}$, $=CO$, $=PR^{19}$ or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_1$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or $R^{19}$ and $R^{20}$ or $R^{19}$ and $R^{21}$ form a ring with the atoms linking them in each case, and $M^2$ is silicon, germanium or tin, wherein the residual catalyst content is less than 100 ppm.

Alkyl is here a straight-chain or branched alkyl.

The monocyclic olefin of the formula VII may, for the purposes of the invention, also be substituted (for example by aryl or alkyl radicals).

The polymerization is preferably carried out in the liquid cycloolefin monomer, cycloolefin monomer mixture or in concentrated solutions.

In the polymerization reaction, at least one symmetrical polycyclic olefin of the formula I, II, III, IV, V or VI, preferably a symmetrical polycyclic olefin of the formula I or III in which $R^1$, $R^2$, $R^3$, $R^4$, $R^5$, $R^6$, $R^7$ and $R^8$ are identical or different and are a hydrogen atom or a $C_1$–$C_8$-alkyl radical, is polymerized.

If desired, a monocyclic olefin of the formula VII in which n is a number from 2 to 10 is also used. Another comonomer is an acyclic olefin of the formula VIII in which $R^9$, $R^{10}$, $R^{11}$ and $R^{12}$ are identical or different and are a hydrogen atom or a $C_1$–$C_8$-alkyl radical. Ethylene or propylene is preferred.

In particular, copolymers of polycyclic olefins, preferably of the formulae I and III, with the acyclic olefins of the formula VIII are prepared.

Particularly preferred cycloolefins are norbornene and tetracyclododecene, with these able to be substituted by ($C_1$–$C_6$)-alkyl. They are preferably copolymerized with ethylene; ethylene/norbornene copolymers are of particular importance.

The cycloolefin copolymers of the invention are preferably obtained when the ratio of cycloolefin to acyclic olefin is optimized.

If the selected concentration of the acyclic olefin at a given cycloolefin concentration is too high, the cycloolefin content of the copolymer falls below 50 mol %. The melting point is shifted to lower temperatures or disappears entirely.

If the concentration of the acyclic olefin at a given cycloolefin concentration is too low, there is a fall, in particular, in the activity of catalysis and in the molecular weight of the copolymer.

The cycloolefin copolymers prepared according to the process described here contain the symmetrical polycyclic olefin of the formula I, II, III, IV, V or VI in an amount from 41 to 59 mol %, preferably from 45 to 55 mol %, particularly preferably from 48 to 52 mol %, in each case based on the total amount of monomers. The acyclic olefin of the formula VIII is contained in the cycloolefin copolymers in an amount from 59 to 41 mol %, preferably from 55 to 45 mol %, particularly preferably from 52 to 48 mol %, in each case based on the total amount of monomers.

Most preferred are cycloolefin copolymers containing the symmetrical polycyclic olefin of the formula I, II, III, IV, V or VI and the acyclic olefin of the formula VIII in a molar ratio of 1:1.

The monocyclic olefin of the formula VII is contained in the cycloolefin copolymers in an amount of less than 5 mol %.

Polycyclic olefins, monocyclic olefins and acyclic olefins are to be taken to include mixtures of two or more olefins of the respective type. This means that tercopolymers and multicopolymers too, can be prepared, as well as polycyclic bicopolymers, according to the polymerization process described. Copolymers of the cycloolefins of the formula VII with the acyclic olefins of the formula VIII can also be advantageously prepared according to the process described. Among the cycloolefins of the formula VII, preference is given to cyclopentene, which may be substituted.

The glass transition temperature of the cycloolefin copolymers of the invention is preferably 100–250° C., particularly preferably from 110 to 220° C. and most preferably from 120 to 150° C.

The melting point preferably lies in the range from 200 to 600° C., particularly preferably from 230 to 400° C. and most preferably from 260 to 300° C.

The catalyst to be used for the polymerization process described comprises an aluminoxane and at least one metallocene (transition metal component) of the formula XI

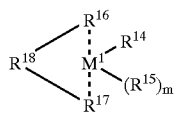
(XI)

In the formula XI, $M^1$ is a metal selected from the group comprising titanium, zirconium, hafnium, vanadium, niobium and tantalum, preferably zirconium and hafnium, particular preference being given to using zirconium.

$R^{14}$ and $R^{15}$ are identical or different and are a hydrogen atom, a $C_1$–$C_{10}$-, preferably $C_1$–$C_3$-, alkyl group, a $C_6$–$C_{10}$-, preferably $C_1$–$C_3$-, alkoxy group, a $C_6$–$C_{10}$-, preferably $C_6$–$C_8$, aryl group, a $C_6$–$C_{10}$-, preferably $C_6$–$C_8$-, aryloxy group, a $C_2$–$C_{10}$-, preferably $C_2$–$C_4$-, alkenyl group, a $C_7$–$C_{40}$-, preferably $C_7$–$C_{10}$-, arylalkyl group, a $C_7$–$C_{40}$-, preferably $C_7$–$C_{12}$-, alkylaryl group, a $C_8$–$C_{40}$-, preferably $C_8$–$C_2$-, arylalkenyl group or a halogen atom, preferably chlorine. m is 1 or 2.

Preferably $R^{16}$ is fluorenyl, indenyl, cyclopentadienyl and $R^{17}$ is cyclopentadienyl and indenyl, where these radicals may be substituted.

The part of the metallocene formed by the central atom $M^1$ and the substituents $R^{16}$–$R^{17}$ has $C_1$ symmetry.

$R^{18}$ is a single-membered or multi-membered bridge which links the radicals $R^{16}$ and $R^{17}$ and is preferably

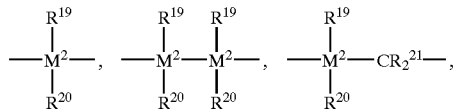

-continued

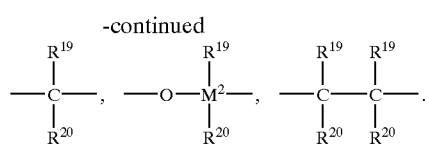

$=BR^{19}=AlR^{19}$, —Ge—, —Sn—, —O—, —S—, =SO, $=SO_2$, $=NR^{19}$, =CO, $=PR^{19}$ or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$ form a ring together with the atoms linking them in each case.

Preferably $R^{18}$ is a radical

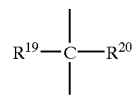

and particularly preferably

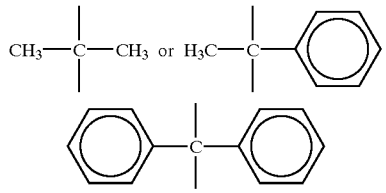

Of the radicals $R^{19}$—$M^2$—$R^{20}$, dimethylsilyl is of particular importance.

$M^2$ is silicon, germanium or tin, preferably silicon or germanium, particularly preferably silicon.

The bridged metallocenes can be prepared according to the following known reaction scheme:

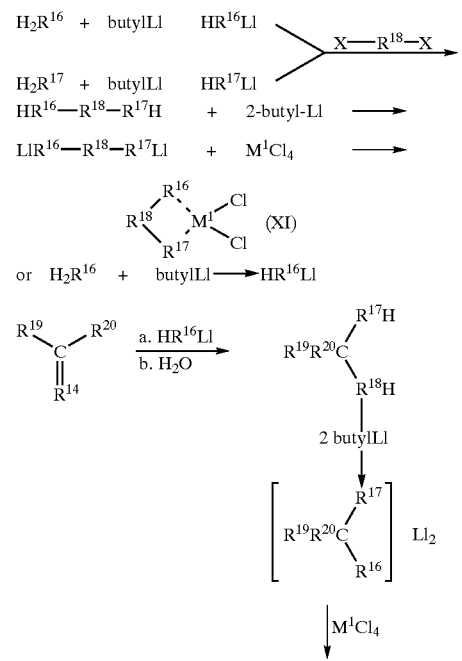

-continued

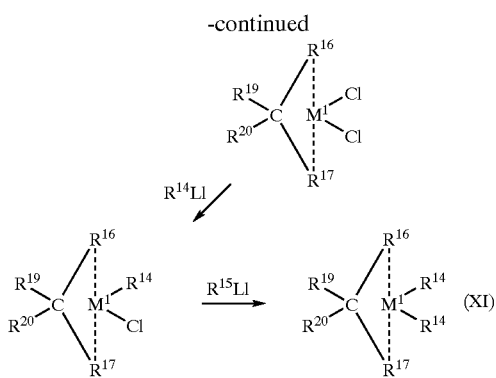

The above reaction scheme is also valid for the cases $R^{19}=R^{20}$ and/or $R^{14}=R^{15}$ (Journal of Organometallic Chem. 288 (1985) 63–67 and EP-A 320 762).

Of the metallocenes of the invention of the formula XI, which all have $C_1$ symmetry in the part of the molecule formed by the central atom $M^1$ and the substituents $R^{16}$–$R^{17}$ (i.e. this part of the molecule has no higher symmetry elements and can be brought into coincident superposition with itself only by rotation through 360°, a single-fold axis), particular preference is given to:

isopropylene (9-fluorenyl) (1-(3-ethyl) cyclopentadienyl)-zirconium dichloride, isopropylene(9-fluorenyl) (1-(3-isopropyl) cyclopentadienyl)zirconium dichloride, isopropylene(9-fluorenyl)(1-(3-methyl) cyclopentadienyl)-zirconium dichloride, diphenylmethylene(9-fluorenyl)(1-(3-methyl) cyclopentadienyl)zirconium dichloride, methylphenylmethylene(9-fluorenyl)(1-(3-methyl) cyclopentadienyl)zirconium dichloride, dimethylsilyl(9-fluorenyl)(1-(3-isopropyl) cyclopentadienyl)zirconium dichloride, dimethylsilyl(9-fluorenyl)(1-(3-methyl) cyclopentadienyl)zirconium dichloride, diphenylsilyl(9-fluorenyl)(1-(3-methyl)cyclopentadienyl) zirconium dichloride, diphenylmethylene(9-fluorenyl)(1-(3-tert-butyl) cyclopentadienyl)zirconium dichloride, isopropenyl(2,3,4,5-tetramethylcyclopentadienyl)-(1-(3-methyl)cyclopentadienyl)zirconium dichloride and isopropylene(9-fluorenyl)(1-(3-tert-butyl) cyclopentadienyl) zirconium dichloride and the corresponding hafnium dichlorides.

Particular preference is given to:

isopropylene (9-fluorenyl) (1-(3-methyl) cyclopentadienyl)-zirconium dichloride.

For an explanation of $C_1$ symmetry, see K. Mislow "Einführung in die Stereochemie", Verlag Chemie, 1st edition, 1967, p. 23 ff.

General preference is given to ligand systems ($R^{16}$-$R^{18}$-$R^{17}$) which can exert a different steric effect on the ligands $R^{14}$ and $R^{15}$. The nature of the ligands $R^{14}$ and $R^{15}$ is of no importance here.

The cocatalyst is (preferably) an aluminoxane of the formula IX and/or the formula X. In these formulae, the radicals $R^{13}$ can be identical or different and are a $C_1$–$C_6$-alkyl group, preferably methyl, ethyl or isobutyl, butyl or neopentyl, or phenyl or benzyl. Particular preference is given to methyl. n is an integer from 0 to 50, preferably from 5 to 40.

The aluminoxane can be prepared in various ways by known processes. One of the methods is, for example, reacting an aluminum-hydrocarbon compound and/or a hydrido-aluminum-hydrocarbon compound with water (gaseous, solid, liquid or bound—for example as water of crystallization) in an inert solvent (such as toluene). To prepare an aluminoxane having different alkyl groups $R^{13}$, two different trialkylaluminums ($AlR_3+AlR'_3$) are reacted with water in accordance with the desired composition (cf. S. Pasynkiewicz, Polyhedron 9 (1990) 429 and EP-A 302 424).

The exact structure of the aluminoxanes is not known.

Independently of the method of preparation, a varying content of unreacted aluminum starting compound, which is present in free form or as an adduct, is common to all aluminoxane solutions.

It is possible to preactivate the metallocene with an aluminoxane of the formula IX and/or X prior to use in the polymerization reaction. The polymerization activity is thereby significantly increased.

The preactivation of the transition metal compound is carried out in solution. The metallocene is here preferably dissolved in a solution of the aluminoxane in an inert hydrocarbon. Suitable inert hydrocarbons are aliphatic or aromatic hydrocarbons. Preference is given to using toluene.

The concentration of the aluminoxane in the solution lies in the range from about 1 mol % up to the saturation limit, preferably from 5 to 30 mol %, in each case based on the total solution. The metallocene can be used in the same concentration, but is preferably used in an amount of $10^{-4}$–1 mol per mol of aluminoxane. The preactivation time is from 5 minutes to 60 hours, preferably from 5 to 60 minutes. The preactivation is carried out at a temperature from –78° C. to 100° C., preferably from 0 to 70° C.

The metallocene can also be prepolymerized or applied to a support. For prepolymerization, the (or one of the) olefin(s) used in the polymerization is preferably employed.

Suitable supports are, for example, silica gels, aluminum oxides, solid aluminoxane or other inorganic support materials. Another suitable support material is a polyolefin powder in finely divided form.

A further possible embodiment of the process of the invention comprises using, in place of or in addition to an aluminoxane, a salt-like compound of the formula $R_xNH_{4-x}BR'_4$ or the formula $R_3PHBR'_4$ as cocatalyst. Here x=1, 2 or 3, R=alkyl or aryl, identical or different, and R'=aryl which can also be fluorinated or partially fluorinated. In this case the catalyst comprises the reaction product of a metallocene with one of the specified compounds (EP-A 277 004).

If solvent is added to the reaction mixture, it is a conventional inert solvent such as, for example, an aliphatic or cycloaliphatic hydrocarbon, a petroleum or hydrogenated diesel oil fraction or toluene.

The metallocene compound is used in a concentration, based on the transition metal, from $10^{-3}$ to $10^{-8}$, preferably from $10^{-4}$ to $10^{-7}$, mol of transition metal per dm$^3$ of reactor volume. The aluminoxane is used in a concentration from $10^{-4}$ to $10^{-1}$, preferably from $10^{-4}$ to $2\times10^{-2}$, mol per dm$^3$ of reactor volume, based on the aluminum content. However, higher concentrations are in principle also possible.

The average molecular weight of the cycloolefin copolymer formed can be controlled in a known manner by metering in of hydrogen, variation of the monomer concentrations or variation of the temperature.

The polydispersity $M_w/M_n$ of the copolymers is very narrow, with values between 1.9 and 3.5. This results in a property profile of the polymers which makes them particularly suitable for fiber production.

As can be shown by X-ray measurements, the cycloolefin copolymers prepared by the process of the invention are partly crystalline. The degree of crystallinity of the cycloolefin copolymers is from 1 to 80%, preferably from 10 to 50%, particularly preferably from 15 to 40%.

The polymers of the invention can also be used for the preparation of polymer alloys. The alloys can be prepared in the melt or in solution. In each case the alloys confine the properties of the components in a way which is favorable for particular applications. For alloys with the polymers of the invention, the following polymers can be used:

polyethylene, polypropylene, ethylene/propylene copolymers, polybutylene, poly(4-methyl-1-pentene), polyisoprene, polyisobutylene, natural rubber, poly(methyl methacrylate), further polymethacrylates, polyacrylates, acrylate/methacrylate copolymers, polystyrene, styrene/acrylonitrile copolymers, bisphenol-A polycarbonate, further polycarbonates, aromatic polyester carbonates, polyethylene terephthalate, polybutylene terephthalate, amorphous polyarylates, nylon-6, nylon-66, further polyamides, polyaramides, polyether ketones, polyoxy-methylene, polyoxyethylene, polyurethanes, polysulfones, polyether sulfones, polyvinylidene fluoride.

To obtain the cycloolefin copolymer in spinnable form, a specific workup of the reaction mixture is carried out subsequent to the polymerization step, this workup serving to reduce the residual catalyst content.

The residual catalyst content or concentration, is taken to be the concentration of compounds which are formed during the course of the polymerization, of the polymerization termination and of the workup of the reaction medium and which remain in the cycloolefin polymer. These residues are essentially compounds of the central atom of the metallocene compound and aluminum compounds. The residual catalyst contents are therefore customarily given in ppm of aluminum and ppm of metallocene metal. Since the aluminum is used in a significant excess (i.e. at least 50 fold) over the central atom, it is convenient to give the residual catalyst content in ppm of aluminum.

The residual catalyst concentration basically depends on the amount of the metallocene and of the aluminum alkyl used in the polymerization per unit amount of polymer produced. This means that the purity of both the monomers and the diluents, and also the monomer concentrations, the polymer concentrations and the catalyst activity are critical in determining the residual catalyst concentration.

Depending on the polymerization process and the catalyst content of the reaction medium, the reaction medium can be worked up in different ways. The type of workup here determines the residual catalyst concentration in the final product.

Variant 1
a) Termination

Only when it is possible to achieve particularly close activities in respect of the metallocene and the aluminum alkyl in the polymerization, i.e. specifically to carry out the catalysis using very small amounts of aluminum alkyl (<500 ppm), can the process be carried out according to variant 1.

The polymerization termination is carried out in a vessel downstream of the polymerization reactor by addition of a terminator while stirring. The terminator is a chemical compound which reacts with the metallocene and/or the aluminum alkyl and thereby converts this/these into an unreactive form. In this variant, preference is given to selecting terminators which react with the metallocene and/or the aluminum alkyl to give compounds which are soluble in aqueous or alcoholic or ketonic solutions and are as a result separated from the cycloolefin copolymer during the precipitation process. Particular preference is given to using isopropanol, methanol, ethanol or tert-butanol as terminator.

If the terminator forms volatile compounds with the metallocene and aluminum alkyl, a reduction of the residual catalyst content can preferably be carried out together with solvent removal during a high-temperature workup such as a flash process, thin-film evaporation or a degassing extruder.

b) Precipitation

The terminated reaction medium can be fed to a precipitation. Preferred precipitants are alcohols, ketones, esters and mixtures containing these. Particular preference is given to using, as precipitants, methanol, ethanol, acetone, ethyl acetate or mixtures comprising more than 50% by volume of these compounds. Subsequently the precipitated polymer is washed at least once, for example with an aqueous, alcoholic or ketonic solution. In contrast to the description in EP 503422, solutions containing HCl or other chlorine-containing compounds may on no account be used in this washing process. Extrusion and spinning tests have shown that, at processing temperatures, cycloolefin polymers which have been washed with HCl-containing solutions are particularly prone to discolor, form pinholes or undergo localized changes which have a negative effect on the processing and the properties of these products. It is assumed that these increased changes can be attributed to the formation of various aluminum chlorides which are known to cause changes in hydrocarbons at high temperatures. Afterwards, the washed product is dried at elevated temperature, as far as possible with exclusion of oxygen, preferably under nitrogen. Drying is preferably carried out between 40° C. below the corresponding glass transition temperature ($T_g$) of the polymer and 300° C, particularly preferably between 10° C. below $T_g$ and 200° C.

c) Concentration

The terminated reaction medium can, however, also be fed to a process for concentrating the reaction medium, either directly or via a further intermediate stage. The concentration is carried out in a conventional single-stage or two-stage evaporation process with the aid of flash equipment or thin-film evaporators or a combination of both. In the case of the combination, the second or last equipment item is a thin-film evaporator. The product worked up by this method is obtained as a polymer melt which can be directly granulated by conventional processes.

An intermediate stage before concentration can be, for example, a scrubbing process using an aqueous scrubbing medium. The reaction medium, which forms a two-phase mixture with the scrubbing solution, is stirred together with the scrubbing solution and subsequently decanted. It is important that the hydrophilicity of the aqueous solution is set so that no polymer goes over into the aqueous phase during scrubbing of the reaction medium. Preferred scrubbing media are alkali or chlorine-free acid aqueous or even alcohol-containing solutions. Particular preference is given to NaOH, sodium carbonate, acetic acid and sulfuric acid solutions.

Variant 2

This variant is preferred to variant 1, because it can also be used at higher catalyst concentrations, particularly an aluminum alkyl concentration above 500 ppm, in the reaction medium. Variant 2 comprises making the partly crystalline cycloolefin polymer in dissolved form flow at least once through a filter medium. Residual catalyst contents of less than 100 ppm of aluminum in the final polymer product are thus achieved regardless of the catalyst concentrations in the reaction medium.

A workup using such a filtration step can be carried out in different ways depending on the type of polymerization.

Variant 2.1. (Polymerization without Particle Formation)

If, during the polymerization, the reaction medium is diluted with a solvent in which the polymer readily dissolves, preferably decalin, a hydrogenated diesel oil fraction having a boiling point between 120 and 160° C. or cyclohexane, in a ratio of solvent to cycloolefin from 4:1 to 1:10, and/or the polymerization temperature used is relatively high, preferably from 50 to 150° C., precipitation of the partly crystalline polymer in the form of particles can be largely avoided. Above a polymer concentration of 5%, gel formation is possible, which, if it occurs, makes it necessary, for example, to reduce the polymerization time or to further increase the polymerization temperature.

a) Termination

If the polymerization proceeds without the polymer precipitating in a heterogeneous particle form which would make possible a simple mechanical separation of the precipitated polymer from the reaction medium, the reaction medium is heated to at least 130° C. The temperature selected is sufficiently high to ensure that the polymer is completely dissolved. So as to favor complete dissolution, an additional solvent can be added. Preference is given to hydrated diesel fractions, decalin, toluene, cyclohexane, chlorobenzene, dichlorobenzene, chloronaphthalene and naphthalene. Decalin and cyclohexane are particularly preferred. Preferred terminators in this process are those compounds which react with the metallocene and/or the aluminum alkyl used and thus give an insoluble compound. Particular preference is given to water, organic monocarboxylic, dicarboxylic and polycarboxylic acids, diols or polyols.

Subsequently a pulverulent, organic or inorganic substance which is insoluble in the reaction medium is suspended in the reaction mixture which may be diluted and in which the polymer is completely dissolved. The suspension is intimately mixed for at least 10 minutes. Preference is given to materials which are used as filter aids and also polar substances which preferably carry OH groups on their particle surface. Particular preference is given to various types of diatomaceous earth, perlites, various types of cellulose and cellulose derivatives. These insoluble substances can also be added to the reaction medium together with the terminator, so that termination and suspension are carried out simultaneously.

b) Filtration

The suspension is then filtered via a filtration layer at preferably constant temperature. The filter layer may comprise various single-layer or multi-layer filters comprising filter cloths and/or nonwoven filter fabrics and/or layers of filter aids, which in at least one layer have a porosity smaller than the average size of the particles suspended in the reaction medium. Preference is given to average porosities which are smaller than the average particle size of the suspended substance by a factor from 2 to 20, particularly by a factor from 3 to 10.

The polymer solution thus obtained can be further worked up either by precipitation or by concentration according to variant 1.

Variant 2.2. (Polymerization with Particle Formation)

If, during the polymerization, the reaction medium is diluted with a solvent in which the polymer is sparingly soluble, preferably hexane, pentane, n-butane, iso-butane or propane in a ratio of solvent to cycloolefin from 4:1 to 0:1 and/or the polymerization temperature is between −70 and 150° C., preferably between 10 and 90° C., precipitation of the partly crystalline polymer in the form of particles can be virtually ensured. The reaction medium is thereby converted into a suspension.

This polymerization method is to be preferred to the process variant in which no polymer particles are precipitated during the polymerization. Limitation by possible gelation or deposit formation is thus avoided.

If the cycloolefin is a poor solvent for the cycloolefin polymer, so that particle formation occurs even without addition of poor solvents, polymerization in pure cycloolefin is to be preferred.

If the polymerization proceeds in such a way that the polymer precipitates in a heterogeneous particle form, a simple mechanical separation of the precipitated polymer from the reaction medium is made possible. Such a process step can of itself remove considerable amounts of metallocene and aluminum alkyl, which may be present in dissolved form, from the product to be worked up and thereby ease or simplify all further purification steps. Such a separation of the precipitated polymer particles from the rest of the reaction medium may comprise conventional filtration or be carried out with the aid of conventional centrifugation processes. The polymer-free reaction medium can be recirculated into the polymerization. To ensure that such recycling does not impair catalysis, the removal of the polymer from the filter or from the centrifuge must be carried out under inert conditions. The advantage of this separation is, inter alia, that in the subsequent dissolution process the residual monomers no longer have to be heated to higher temperatures at which secondary reactions, cracking and fish eye formation can occur, all of which have a negative effect both on the overall monomer yield and also on the uniformity and purity of the final polymer product.

The removed polymer is then dissolved in a solvent at elevated temperature. Solution temperatures from 130 to 200° C. are preferred. The selected temperature is sufficiently high to ensure that the polymer is completely dissolved. Preferred solvents are hydrogenated diesel fractions, decalin, toluene, cyclohexane, chlorobenzene, dichlorobenzene, chloronaphthalene and naphthalene. Particular preference is given to decalin, chlorobenzene, dichlorobenzene and cyclohexane. This solution can, using the procedure described under variant 2.1., be admixed with terminator and insoluble substances, filtered hot and subsequently be further worked up by means of the precipitation described under variant 1 or by concentration.

The workup process of the invention can also, in addition to the catalyst systems described here (metallocenes and aluminum alkyls), be applied to the removal of other catalyst systems (for example Ziegler catalysts) which can be used for cycloolefin polymerization.

The cycloolefin copolymers worked up according to the invention are particularly suitable for the production of fibers. The fibers can be spun from the melt using conventional industrial processes. The spinning solution and also the polymer melt can additionally be freed of particles and gel particles by a further filtration.

If the melting point of the cycloolefin copolymer lies above 300° C., the polymer can be made into a paste using high-boiling hydrocarbons so as to improve the processability. In a melt-spinning process, the polymer is melted in a single-screw or twin-screw extruder or in a piston extruder. Melting in a piston extruder can be carried out by heating the barrel. A further possibility is to press the polymer against a heated grid, whereupon the polymer melts. The polymer melt then flows through a spinning head having one or more spinnerets. The fiber or filaments are preferably wound onto bobbins at an increased take-off rate.

The melt-spun fiber is preferably further drawn while being heated. Here the fiber is passed through one or more heating zones, with it being possible to set different drawing conditions. Preferably, high draw ratios are used, by which means the crystallinity of the fiber is further increased.

The fiber or filaments are generally drawn so as to achieve high mechanical strength and high elastic moduli. The draw ratio is usually from 1.1 to 50, preferably from 1.5 to 30, particularly preferably from 2 to 10.

Drawing can be carried out in a single step, or in two or even more steps. Furthermore, the fibers or filaments can be subjected to heat treatment at the same or a higher temperature so as to increase the crystallinity. Heat transmission can be effected by means of a hot plate (which may be curved) or cylindrical devices.

The drawing temperatures advantageously lie between the glass transition temperature and the melting point. For cycloolefin copolymers of the invention, the first drawing is carried out at temperatures between 100 and 500° C., preferably between 120 and 300° C.

A subsequent thermal after treatment at the same or a higher temperature than the drawing temperature with application of a small tensile stress serves to set the fiber. A tendency to shrink at higher temperatures is thereby reduced.

The spinning speed can be up to 5000 m/min or more. Highly oriented as-spun yarns can thus be obtained, these requiring only a small amount of additional drawing. The drawing of the fibers is in accordance with the desired elongation at break, the drawing generally being carried out in such a way as to obtain elongations at break of 2–50%, preferably 10–40%, particularly preferably 15–30%.

The drawn fibers have tensile strengths from 70 to 1000 MPa, preferably from 200 to 800 MPa, particularly preferably from 300 to 500 MPa. The linear density of the fiber lies in the range from 0.01 to 100 g/km, preferably from 0.05 to 20 g/km, particularly preferably from 0.2 to 10 g/km. The modulus lies in the range from 2 to 20 GPa, preferably from 5 to 10 GPa, particularly preferably from 6 to 8 GPa.

The fiber of the invention can, for example, be used as an industrial fiber, in woven fabrics for the textile sector and in industry or in nonwovens. Filaments, multi-filaments, ropes and cables can be produced. The excellent hydrolysis resistance and UV resistance deserve emphasis. Likewise, the good strength at elevated temperature deserves mention.

The glass transition temperatures $T_g$ given in the following examples were determined by DSC (Differential Scanning Calorimetry) at a heating rate of 20° C./min. The viscosity numbers given were determined in accordance with DIN 53 728.

The residual catalyst content was determined as aluminum content by X-ray fluorescence spectroscopy.

The norbornene content in the cycloolefin copolymer was determined by quantitative $^{13}$C-NMR spectroscopy.

EXAMPLE 1

A 75 dm$^3$ reactor was filled with ethylene and 15 dm$^3$ of norbornene and 15 dm$^3$ of decalin were added. By multiple pressurization with ethylene (6 bar) the solution was saturated with ethylene. The pressure was set to 2.5 bar (gage pressure), 500 cm$^3$ of a methylaluminoxane solution in toluene (10.1 percent by weight of methylaluminoxane having a cryoscopically determined molecular weight of 1300 g/mol) were introduced into the reactor and the mixture was stirred for 15 minutes at 70° C. A solution of 150 mg of isopropylene(9-fluorenyl)(1-(3-methyl) cyclopentadienyl)zirconium dichloride in 500 cm$^3$ of a methyl-aluminoxane solution in toluene was added after 15 minutes of preactivation. (For molecular weight regulation, hydrogen can be metered in prior to the addition of catalyst).

The polymerization was carried out at 70° C. while stirring (750 rpm), the ethylene pressure being maintained at 2.5 bar by metering in further amounts.

50 l of decalin were placed in a second stirred reactor (150 dm$^3$) and 500 g of diatomaceous earth ($^{(R)}$Celite) were suspended therein. 200 ml of water were dispersed in the mixture, the water being absorbed by the diatomaceous earth. 0.5 g of antioxidant (Hostanox SE 10) and 0.5 g of peroxide decomposer (Hostanox 03) were added to the suspension and the temperature of the mixture was adjusted to 90° C.

After 60 minutes' reaction time, the reaction solution was quickly drained into the second stirred reactor. The mixture was heated to 170° C. while stirring, a pressure of about 2 bar being reached.

On the filter cloth (Seitzfilter T 5500) of a 120 l pressure filter, a filter cake was built up of 500 g of Celite, suspended in 10 l of a hydrogenated diesel oil fraction, and the filter was subsequently heated to 160° C.

The polymer solution was filtered through the pressure filter. The procedure was such that the filtrate was conveyed back into the filter for the first 15 minutes (i.e. was recirculated). A pressure of 2.8 bar of nitrogen was built up over the solution.

The polymer solution was subsequently stirred into 500 l of acetone by means of a high speed mixer ($^{(R)}$Ultraturrax) and was thus precipitated. The acetone suspension was circulated via a 680 l stirred pressure filter with open bottom valve. After closing the bottom valve the mixture was filtered. The solid polymer was washed three times with acetone. 50 g of stabilizer (1 g of Irganox 1010) was added to the last wash.

The acetone was then completely pressed out and the product was predried at 100° C. for three hours. The final drying was carried out for 10 hours at 10 mbar and 160° C. with slow nitrogen blanketing in a drying cabinet.

2100 g of colorless pulverulent polymer were obtained. The glass transition temperature $T_g$ was 126° C. and the melting point $T_m$ was 284° C. The viscosity number was measured as 59 ml/g at 135° C. after dissolution for one hour at 180° C. The residual catalyst content was 18 ppm.

EXAMPLE 2

Comparative Example

A 1.5 dm$^3$ reactor was filled with ethylene and 600 cm$^3$ of an 85 percent by weight solution of norbornene in toluene was added. By multiple pressurization with ethylene (6 bar), the solution was saturated with ethylene. The pressure was set to 0.5 bar (gage pressure), 5 cm$^3$ of a methylaluminoxane solution in toluene (10.1 mol % of methylaluminoxane having a cryoscopically determined molecular weight of 1300 g/mol) were introduced into the reactor and the mixture was stirred for 15 minutes at 70° C. A solution of 5 mg of isopropylene(9-fluorenyl)(1-(3-methyl)cyclopentadienyl) zirconium dichloride in 5 cm$^3$ of methylaluminoxane solution in toluene was added after 15 minutes of preactivation. (For regulation of the molecular weight, hydrogen can be added prior to the catalyst addition).

The polymerization was carried out at 40° C. for one hour while stirring (750 rpm), the ethylene pressure being maintained at 2 bar by metering in further amounts.

The reaction solution was drained into a vessel and quickly added dropwise to 5 dm³ of acetone, stirred for 10 minutes and subsequently filtered.

The solid obtained was washed a number of times alternately with 10% strength hydrochloric acid and acetone. The solid was washed to neutrality and again stirred with acetone. The polymer which was again filtered off was dried at 80° C. and at a pressure of 0.2 bar for 15 hours.

54 g of a colorless polymer were obtained. A viscosity number VN of 131 cm³/g and a glass transition temperature $T_g$ of 133° C. were measured. The ratio of norbornene/ethylene incorporated is, according to the NMR spectrum, about 50 mol % of norbornene to 50 mol % of ethylene. The residual catalyst content was 315 ppm.

EXAMPLES 3 TO 8

The polymerizations were carried out in the same way as Example 1, the gage pressures of ethylene, the amount of catalyst and the reaction time being varied according to Table 1.

was 149° C. No melting point or crystallization could be detected in the DSC. According to $^{13}$C-NMR, the polymer contains 49 mol % of 5-methylnorbornene.

EXAMPLE 10

Production of Test Pieces

Polymers prepared according to Example 1 were pressed into plates by pressing for 15 minutes at 300° C. and a pressure of 10 bar. The pieces were subsequently cooled to 100° C. at a rate of 20 K/min and under a pressure of 10 bar, and the plates were then taken from the film press. The round plates so obtained had a diameter of 60 nm and a thickness of 1 mm.

EXAMPLE 11

Tests for Solvent Resistance

The pressed plates from Example 10 were weighed and the weight M1 was determined. Subsequently the pressed plates were stored in toluene, cyclohexane, hexane, chloroform and dichloromethane at room temperature for 24 hours. Subsequently the plates were washed by brief immersion in pentane. Adhering solvent evaporated within a few minutes. By reweighing (weight M2) not more than 3 minutes after washing with pentane, and by taking the difference (M2-M1), the percentage change in mass was determined. [(M2/M1−1)100=M in %]. The results are shown in Table 2.

TABLE 1

| Example | Amount of catalyst/g | Gage pressure of ethylene/bar | Reaction time/min | Yield kg | VN cm³/g | $T_g$ ° C. | $T_m$ ° C. | Norbornene content mol % | Degree of swelling* in toluene/ % weight increase |
|---|---|---|---|---|---|---|---|---|---|
| 3 | 0.5 | 0.3 | 100 | 2.1 | 35 | 141 | 239 | 54 | 54 |
| 4 | 0.5 | 0.5 | 80 | 1.9 | 43 | 137 | 260 | 53 | 39 |
| 5 | 0.25 | 1.0 | 90 | 1.7 | 47 | 133 | 275 | 52 | 0.2 |
| 6 | 0.15 | 2.0 | 60 | 1.1 | 53 | 129 | 279 | 51 | 0.2 |
| 1 | 0.15 | 2.5 | 60 | 1.4 | 59 | 126 | 284 | 50 | 0.1 |
| 7 | 0.15 | 3.5 | 60 | 1.7 | 74 | 119 | 267 | 48 | 32 |
| 8 | 0.1 | 6.0 | 40 | 1.9 | 93 | 105 | 232 | 46 | 40 |

*Degree of swelling: percentage weight increase after storage in toluene at room temperature for 14 days

EXAMPLE 9

A 1.5 dm³ reactor was charged with 600 ml of 5-methylnorbornene. 5 cm³ of methylaluminoxane solution in toluene (10 mol % of methylaluminoxane having a cryoscopically determined molecular weight of 1300 g/mol) were introduced into the reactor and by multiple pressurization with ethylene (6 bar) the mixture was saturated with ethylene and was stirred for 15 minutes. The temperature was set to 70° C. and the pressure to 2 bar (gage pressure).

A solution of 2 mg of isopropylene(9-fluorenyl)(1-(3-methyl)cyclopentadienyl)zirconium dichloride in 5 cm³ of methylaluminoxane solution in toluene was introduced into the reactor.

The polymerization was carried out at 70° C. for one hour while stirring. The ethylene pressure was maintained at a constant 2 bar by metering in further amounts.

The reaction solution was drained into a vessel.

The solution was admixed with 10 g of diatomaceous earth which had been suspended in 200 ml of toluene and moistened with 5 ml of water.

The mixture was stirred for 20 minutes and filtered via a 3 dm³ pressure filter. The clear solution was introduced into 5 dm³ of acetone. The precipitated product was filtered off and washed three times with acetone. Subsequently it was dried at 100° C. and 0.2 bar for 15 hours.

26 g of colorless polymer were obtained. The viscosity number was 64 cm³/g and the glass transition temperature

TABLE 2

| Solvent | M [%] |
|---|---|
| Toluene | +0.1 |
| Cyclohexane | +0.1 |
| Hexane | +/−<0.1, i.e. 0 |
| Dichloromethane | +0.8 |
| Chloroform | +1.1 |

EXAMPLE 12

The polymers from Examples 3 to 8 were also made into pressed plates as in Example 10.

The solvent resistance in toluene was tested as in Example 11, the storage time in toluene being 14 days.

The weight change of the sample is shown in Table 1.

It is found that particularly low degrees of swelling are obtained if the melting points of the partly crystalline cycloolefin copolymers lie above 267° C. and the norbornene content is about 50 mol %.

EXAMPLE 13

The specific density of the pressed plates from Example 10 was determined. The determination was carried out by means of the buoyancy method. The specific density was 1.032 g/cm³.

A pressed plate produced as in Example 10 was quenched in ice-water after melting at 300° C. The specific density was 1.018 g/cm³.

EXMAPLES 14 TO 17

The polymer from Example 1 was pressed into a rod at 280° C. in vacuo. This rod was placed in a single-piston extruder and was pressed against a heated grid ($T_1$; Table 1), thus melting the polymer. The melt flowed through a metal filter (sintered metal, fineness 5 μm) ($T_2$, Table 1) and subsequently passed through a single-hole spinneret (dimensions of the capillary: diameter 50 μm, length 70 μm). The melt had a temperature $T_3$ (Table 1). The flow (Table 1) was varied by changing the piston feed. Furthermore, the take-off speed (Table 1) of the melt from the spinneret was varied.

Stress/strain diagrams were recorded (Instron) for the fibers (Table 2). The elastic modulus, the tensile strength and the elongation at break were determined.

The linear density of the fiber was determined by accurately weighing a defined length.

EXAMPLES 18 TO 20

The filaments obtained according to Examples 15 and 17 (strands, Table 3) were drawn and oriented with the aid of a two-stage drawing apparatus.

The filament was taken off the fiber bobbin (spool 1, Table 3) and taken up by a second spool (spool 2, Table 3) running at a higher speed. On the way the fiber runs through a heating zone (curved hot plate) (temperature 140° C.), in which it was drawn. From spool 2, the fiber passes through a second heating zone (temperature about 190° C.) which serves to set the fiber, after which it is again taken up on a bobbin (spool 3, Table 3) and is thus again slightly drawn.

Stress-strain curves were likewise measured (Table 4).

TABLE 1

| Example | $T_1$ ° C. | $T_2$ ° C. | $T_3$ ° C. | Take-off speed m/min | Flow through spinneret g/min |
|---|---|---|---|---|---|
| 14 | 300 | 284 | 289 | 750 | 0.3 |
| 15 | 300 | 284 | 289 | 75 | 0.4 |
| 16 | 291 | 280 | 279 | 600 | 0.13 |
| 17 | 291 | 280 | 279 | 25 | 0.14 |

TABLE 2

| Example | Linear density g/km | Tensile strength MPa | Elongation at break % | Modulus GPa |
|---|---|---|---|---|
| 14 | 0.39 | 118 | 74 | 3.2 |
| 15 | 5.5 | 64 | 2.3 | 2.9 |
| 16 | 0.22 | 136 | 91 | 3.3 |
| 17 | 5.6 | 64 | 2.3 | 2.9 |

TABLE 3

| Example | Raw fiber from Ex. | Spool 1 m/min | Spool 2 m/min | Spool 3 m/min | Draw ratio spool 3/ spool 1 |
|---|---|---|---|---|---|
| 18 | 15 | 5 | 18.3 | 20.6 | 4.1 |
| 19 | 16 | 5 | 19.4 | 21.6 | 4.3 |
| 20 | 17 | 5 | 19.4 | 25.1 | 5.0 |

TABLE 4

| Example | Linear density g/km | Tensile strength MPa | Elongation at break % | Modulus GPa |
|---|---|---|---|---|
| 18 | 1.4 | 310 | 18 | 6.5 |
| 19 | 1.4 | 300 | 25 | 6.1 |
| 20 | 1.1 | 360 | 9 | 7.2 |

EXAMPLE 21

Suspension Polymerization

A 1.5 dm³ reactor was filled with ethylene. 500 cm³ of norbornene melt, 500 cm³ of hexane and 5 cm³ of methylaluminoxane solution in toluene were introduced and the mixture was stirred for 15 minutes at 50° C. The ethylene pressure was set to 2.3 bar and the temperature to 70° C. 10 mg of isopropylene(9-fluorenyl)(1-(3-methyl)cyclopentadienyl)zirconium dichloride were dissolved in 5 cm³ of methylaluminoxane solution in toluene and likewise introduced into the reactor.

Polymerization was carried out at 70° C. for 60 minutes, the ethylene pressure being kept constant. Subsequently the suspension was drained into a vessel and without further treatment was filtered via a glass suction filter. The solid was washed with hexane and dried.

The solid was suspended in 500 cm³ of decalin, and mixed with 5 g of ®Celite and 2 cm³ of water and heated to 170° C. while stirring. The suspension was filtered through a 3 dm³ pressure filter (filter cloth: Seitzfilter T5500) at 170° C. The solution obtained was quickly dispersed in 5 dm³ of acetone with intensive stirring. The solid was filtered off and dispersed and washed in 2 dm³ of acetone a number of times. The polymer product was predried at 0.2 bar and 100° C. for 15 hours and end-dried for 2 hours at 160° C. and 0.1 mbar.

78 g of polymer were obtained. The glass transition temperature was 128° C., the melting point was 284° C.

The open polymerization reactor had no deposits on the walls.

EXAMPLE 22

Comparative Example for Examples 14 to 17

The polymer from Example 2 was introduced into the spinning equipment as described in Examples 14–17. However, spinning tests were unsuccessful, since the filaments broke.

What is claimed is:

1. A process of purification of a polymer which comprises a cycloolefin copolymer which is prepared by polymerization of from 30 to 99.9% by weight, based on the total amount of monomers, of at least one symmetrical, polycyclic olefin of the formula I, II, III, IV, V or VI

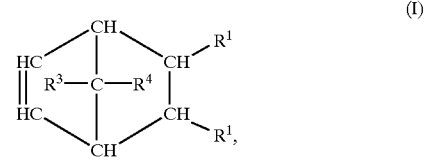
(I)

-continued

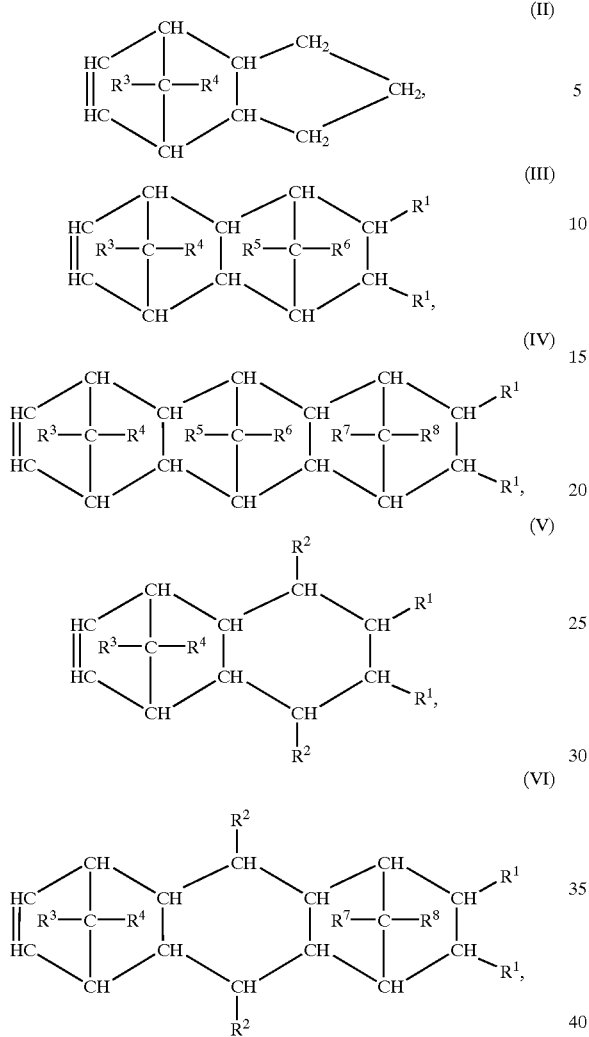

in which $R^1$, $R^2$, $R^3$, $R^4$, $R^5$, $R^6$, $R^7$, and $R^8$ are identical or different and are a hydrogen atom, a $(C_6-C_{16})$-aryl or a $(C_1-C_8)$-alkyl radical, with the same radicals in the various formulae being able to have a different meanings, from 0 to 50% by weight, based on the total weight of monomers, of a cycloolefin of the formula VII

in which n is a number from 2 to 10, and from 70 to 0.1% by weight, based on the total amount of monomers, of at least one acyclic olefin of the formula VIII

in which $R^9$, $R^{10}$, $R^{11}$ and $R^{12}$ are identical or different and are a hydrogen atom or a $(C_1-C_8)$-alkyl radical, at temperatures from −78 to 150° C. and a pressure from 0.01 to 64 bar, in the presence of a catalyst which comprises an aluminoxane of the formula IX

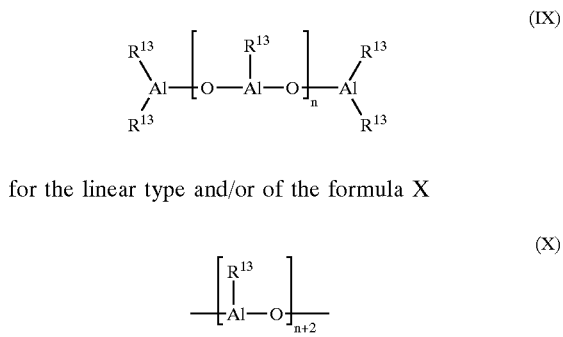

for the linear type and/or of the formula X $$\left[ \begin{array}{c} R^{13} \\ | \\ Al-O \end{array} \right]_{n+2} \quad (X)$$

for the cyclic type, where in the formulae IX and X the radicals $R^{13}$ are identical or different and are a $(C_1-C_6)$-alkyl group or phenyl or benzyl and n is an integer from 0 to 50, and a metallocene of the formula XI

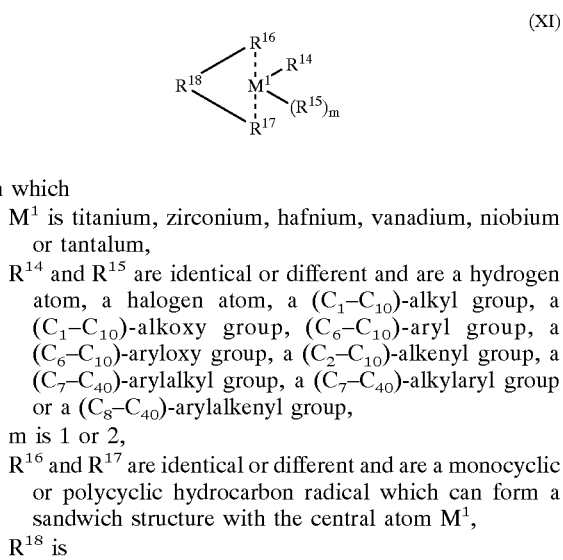

in which
$M^1$ is titanium, zirconium, hafnium, vanadium, niobium or tantalum, $R^{14}$ and $R^{15}$ are identical or different and are a hydrogen atom, a halogen atom, a $(C_1-C_{10})$-alkyl group, a $(C_1-C_{10})$-alkoxy group, $(C_6-C_{10})$-aryl group, a $(C_6-C_{10})$-aryloxy group, a $(C_2-C_{10})$-alkenyl group, a $(C_7-C_{40})$-arylalkyl group, a $(C_7-C_{40})$-alkylaryl group or a $(C_8-C_{40})$-arylalkenyl group, m is 1 or 2, $R^{16}$ and $R^{17}$ are identical or different and are a monocyclic or polycyclic hydrocarbon radical which can form a sandwich structure with the central atom $M^1$, $R^{18}$ is

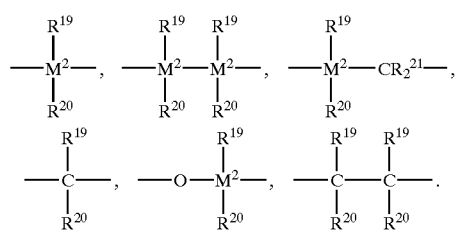

$BR^{19}$=$AlR^{19}$, —Ge—, —Sn—, —O—, —S—, =SO, =SO$_2$, =NR$^{19}$, =CO, =PR$^{19}$ or =P(O)R$^{19}$, where $R^{19}$, $R^{20}$ and $R^{21}$ are identical or different and are a hydrogen atom, a halogen atom, a $(C_1-C_{10})$-alkyl group, a $(C_1-C_{10})$-fluoroalkyl group, $(C_6-C_{10})$-fluoroaryl group, a $(C_6-C_{10})$-aryl group, a $(C_1-C_{10})$-alkoxy group, a $(C_2-C_{10})$-alkenyl group, a $(C_7-C_{40})$-arylalkyl group, a $(C_8-C_{40})$-arylalkenyl group or a $(C_7-C_{40})$-alkylaryl group or a $R^{19}$ and $R^{20}$ or $R^{19}$ and $R^{21}$ form a ring with the atoms linking them in each case, and $M^2$ is silicon, germanium or tin, and whereby the cycloolefin copolymer is kept in solution during the reaction either by (i) diluting the reaction medium during the polymerization with a solvent or (ii) by properly adjusting the temperature of the reaction medium wherein a) a terminator, which reacts with the metallocene and/or an aluminum alkyl, and a pulverunt substance which is insoluble in the reaction medium is added to the reaction mixture b) the suspension obtained is filtered whereby the solid material is removed and leaving the liquid the liquid polymer solution and c) subsequently either a precipitant is added to the polymer solution and the precipitated cycloolefin copolymer washed without using chlorine-containing compounds or the polymer solution is concentrated.

2. The process as claimed in claim 1, wherein the terminator is a compound which reacts with the metallocene and/or the aluminum alkyl to give an insoluble compound.

3. The process as claimed in claim 2, wherein the terminator is water, an organic monocarboxylic acid, an organic dicarboxylic acid, an organic polycarboxylic acid, a diol or a polyol.

4. The process as claimed in claim 1, the solvent is hydrated diesel fraction, decalin, toluene, cyclohexane, chlorobenzene, dichlorobenzene, chloronaphthalene or naphthalene.

5. The process as claimed in claim 1, wherein the solvent is decalin or cyclohexane.

6. The process as claimed in claim 1, wherein the pulverunt substance is a material which is used as a filter aid or a polar substance which carry OH groups on their particle surface.

7. The process as claimed in claim 1 wherein the pulverunt substance is a diatomaceous earth, a perlite, cellulose or a cellulose derivative.

8. The process as claimed in claim 1, wherein the concentration of the polymer solution is performed with the aid of a flash equipment or thin-film evaporator.

9. The process as claimed in claim 1, wherein the terminator is a compound which reacts with the metallocene and/or the aluminum alkyl to give compounds which are soluble in aqueous or alcoholic or ketonic solutions.

10. The process as claimed in claim 1, wherein the terminator is isopropanol, methanol, ethanol, or tert-butanol.

11. The process as claimed in claim 1, wherein the precipitant is alcohol, ketone or ester.

12. The process as claimed in claim 1, wherein the precipitant is methanol, ethanol, acetone or ethylacetate.

13. The process as claimed in claim 1 wherein the precipitant is added in an amount of more than 50% by volume of the reaction mixture.

14. A method for preparing a polymer which comprises a cycloolefin copolymer which is prepared by polymerization of from 30 to 99.9% by weight, based on the total amount of monomers, of at least one symmetrical, polycyclic olefin of the formula I, II, III, IV, V or VI

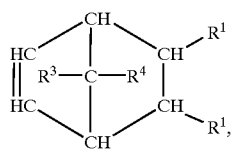
(I)

-continued

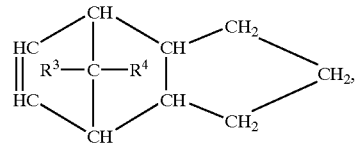
(II)

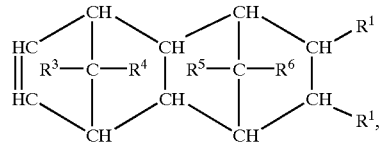
(III)

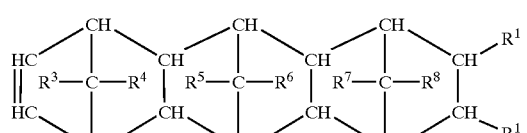
(IV)

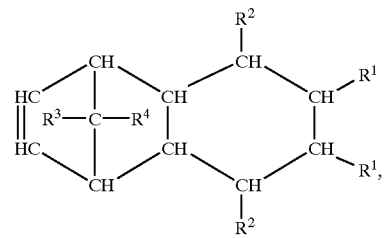
(V)

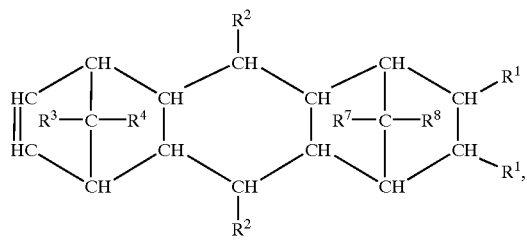
(VI)

in which $R^1$, $R^2$, $R^3$, $R^4$, $R^5$, $R^6$, $R^7$, and $R^8$ are identical or different and are a hydrogen atom, a $(C_6-C_{16})$-aryl or a $(C_1-C_8)$-alkyl radical, with the same radicals in the various formulae being able to have a different meanings, from 0 to 50% by weight, based on the total weight of monomers, of a cycloolefin of the formula VII

(VII)

in which n is a number from 2 to 10, and from 70 to 0.1% by weight, based on the total amount of monomers, of at least one acyclic olefin of the formula VIII

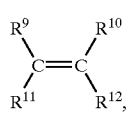
(VIII)

in which $R^9$, $R^{10}$, $R^{11}$ and $R^{12}$ are identical or different and are a hydrogen atom or a $(C_1-C_8)$-alkyl radical, at temperatures from −78 to 150° C. and a pressure from 0.01 to 64 bar, in the presence of a catalyst which comprises an aluminoxane of the formula IX

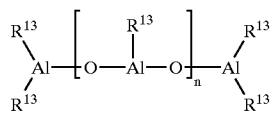 (IX)

for the linear type and/or of the formula X

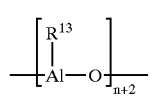 (X)

for the cyclic type, where in the formulae IX and X the radicals $R^{13}$ are identical or different and are a $(C_1-C_6)$-alkyl group or phenyl or benzyl and n is an integer from 0 to 50, and a metallocene of the formula XI

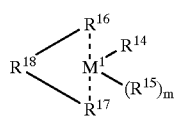 (XI)

in which $M^1$ is titanium, zirconium, hafnium, vanadium, niobium or tantalum, $R^{14}$ and $R^{15}$ are identical or different and are a hydrogen atom, a halogen atom, a $(C_1-C_{10})$-alkyl group, a $(C_1-C_{10})$-alkoxy group, $(C_6-C_{10})$-aryl group, a $(C_6-C_{10})$-aryloxy group, a $(C_2-C_{10})$-alkenyl group, a $(C_7-C_{40})$-arylalkyl group, a $(C_7-C_{40})$-alkylaryl group or a $(C_8-C_{40})$-arylalkenyl group, m is 1 or 2, $R^{16}$ and $R^{17}$ are identical or different and are a monocyclic or polycyclic hydrocarbon radical which can form a sandwich structure with the central atom $M^1$, $R^{18}$ is

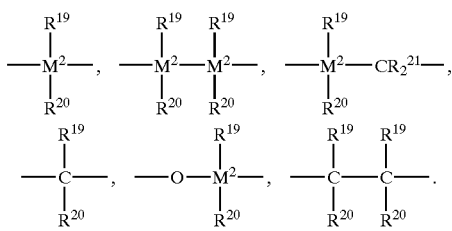

$BR^{19}=AlR^{19}$, —Ge—, —Sn—, —O—, —S—, =SO, =SO$_2$, =NR$^{19}$, =CO, =PR$^{19}$ or =P(O)R$^{19}$, where $R^{19}$, $R^{20}$ and $R^{21}$ are identical or different and are a hydrogen atom, a halogen atom, a $(C_1-C_{10})$-alkyl group, a $(C_1-C_{10})$-fluoroalkyl group, $(C_6-C_{10})$-fluoroaryl group, a $(C_6-C_{10})$-aryl group, a $(C_1-C_{10})$-alkoxy group, a $(C_2-C_{10})$-alkenyl group, a $(C_7-C_{40})$-arylalkyl group, a $(C_8-C_{40})$-arylalkenyl group or a $(C_7-C_{40})$-alkylaryl group or a $R^{19}$ and $R^{20}$ or $R^{19}$ and $R^{21}$ form a ring with the atoms linking them in each case, and $M^2$ is silicon, germanium or tin, and whereby the cycloolefin copolymer is kept in solution during the reaction either by (i) diluting the reaction medium during the polymerization with a solvent or (ii) by properly adjusting the temperature of the reaction medium wherein a) a terminator, which reacts with the metallocene and/or an aluminum alkyl, and a pulverunt substance which is insoluble in the reaction medium is added to the reaction mixture b) the suspension obtained is filtered whereby the solid material is removed and leaving the liquid the liquid polymer solution and c) subsequently either a precipitant is added to the polymer solution and the precipitated cycloolefin copolymer washed without using chlorine-containing compounds or the polymer solution is concentrated.

15. The process as claimed in claim 14, wherein the terminator is a compound which reacts with the metallocene and/or the aluminum alkyl to give an insoluble compound.

16. The process as claimed in claim 14, wherein the terminator is water, an organic monocarboxylic acid, an organic dicarboxylic acid, an organic polycarboxylic acid, a diol or a polyol.

17. The process as claimed in claim 14, wherein the solvent is hydrated diesel fraction, decalin, toluene, cyclohexane, chlorobenzene, dichlorobenzene, chloronaphthalene or naphthalene.

18. The process as claimed in claim 14, wherein the solvent is decalin or cyclohexane.

19. The process as claimed in claim 14, wherein the pulverunt substance is a material which is used as a filter aid or a polar substance which carry OH groups on their particle surface.

20. The process as claimed in claim 14, wherein the pulverunt substance is a diatomaceous earth, a perlite, cellulose or a cellulose derivative.

21. The process as claimed in claim 14, wherein the concentration of the polymer solution is performed with the aid of a flash equipment or thin-film evaporator.

22. The process as claimed in claim 14, wherein the precipitant is alcohol, ketone or ester.

23. A method of preparing a polymer which comprises a cycloolefin copolymer which is prepared by polymerization of from 30 to 99.9% by weight, based on the total amount of monomers, of at least one symmetrical, polycyclic olefin of the formula I, II, III, IV, V or VI

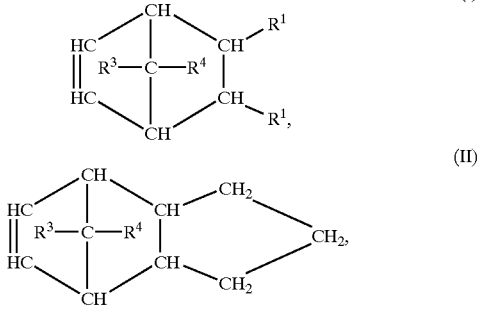

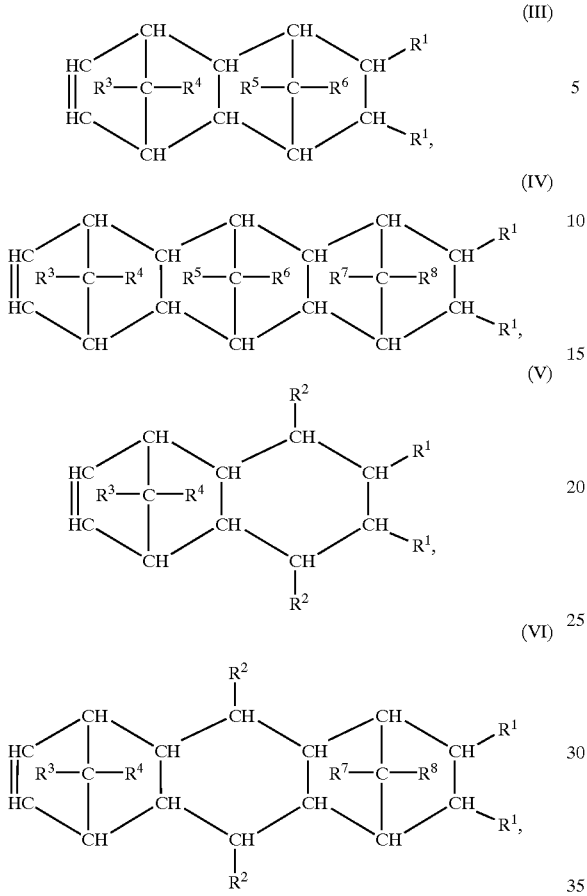

(III)

(IV)

(V)

(VI)

in which $R^1$, $R^2$, $R^3$, $R^4$, $R^5$, $R^6$, $R^7$, and $R^8$ are identical or different and are a hydrogen atom, a $(C_6-C_{16})$-aryl or a $(C_1-C_8)$-alkyl radical, with the same radicals in the various formulae being able to have a different meanings, from 0 to 50% by weight, based on the total weight of monomers, of a cycloolefin of the formula VII $$\begin{array}{c} CH{-}CH \\ \diagdown \diagup \\ (CH_2)_n \end{array}$$ (VII)

in which n is a number from 2 to 10, and from 70 to 0.1% by weight, based on the total amount of monomers, of at least one acyclic olefin of the formula VIII (VIII)

in which $R^9$, $R^{10}$, $R^{11}$ and $R^{12}$ are identical or different and are a hydrogen atom or a $(C_1-C_8)$-alkyl radical, at temperatures from −78 to 150° C. and a pressure from 0.01 to 64 bar, in the presence of a catalyst which comprises an aluminoxane of the formula IX (IX)

for the linear type and/or of the formula X (X)

for the cyclic type, where in the formulae IX and X the radicals $R^{13}$ are identical or different and are a $(C_1-C_6)$-alkyl group or phenyl or benzyl and n is an integer from 0 to 50, and a metallocene of the formula XI (XI)

in which $M^1$ is titanium, zirconium, hafnium, vanadium, niobium or tantalum, $R^{14}$ and $R^{15}$ are identical or different and are a hydrogen atom, a halogen atom, a $(C_1-C_{10})$-alkyl group, a $(C_1-C_{10})$-alkoxy group, $(C_6-C_{10})$-aryl group, a $(C_6-C_{10})$-aryloxy group, a $(C_2-C_{10})$-alkenyl group, a $(C_7-C_{40})$-arylalkyl group, a $(C_7-C_{40})$-alkylaryl group or a $(C_8-C_{40})$-arylalkenyl group, m is 1 or 2, $R^{16}$ and $R^{17}$ are identical or different and are a monocyclic or polycyclic hydrocarbon radical which can form a sandwich structure with the central atom $M^1$, $R^{18}$ is

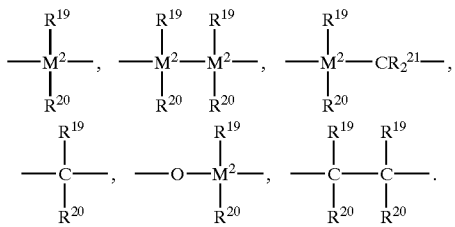

$BR^{19}$=$AlR^{19}$, —Ge—, —Sn—, —O—, —S—, =SO, =SO$_2$, =NR$^{19}$, =CO, =PR$^{19}$ or =P(O)R$^{19}$, where $R^{19}$, $R^{20}$ and $R^{21}$ are identical or different and are a hydrogen atom, a halogen atom, a $(C_1-C_{10})$-alkyl group, a $(C_1-C_{10})$-fluoroalkyl group, $(C_6-C_{10})$-fluoroaryl group, a $(C_6-C_{10})$-aryl group, a $(C_1-C_{10})$-alkoxy group, a $(C_2-C_{10})$-alkenyl group, a $(C_7-C_{40})$-arylalkyl group, a $(C_8-C_{40})$-arylalkenyl group or a $(C_7-C_{40})$-alkylaryl group or a $R^{19}$ and $R^{20}$ or $R^{19}$ and $R^{21}$ form a ring with the atoms linking them in each case, and $M^2$ is silicon, germanium or tin, and whereby the reaction mixture is converted into a suspension by either (i) diluting it with a solvent in which the cycloolefin copolymer is sparingly soluble or (ii) by properly adjusting the temperature, wherein the cycloolefin copolymer is separated, dissolved in a solvent at elevated temperatures, a) a terminator, which reacts with the metallocene and/or an aluminum alkyl, and a pulverunt substance which is insoluble in the reaction medium is added to the solution, b) the suspension obtained is filtered whereby the solid material is removed and leaving the polymer solution and c) subsequently either a precipitant is added to the polymer solution and the precipitated cycloolefin copolymer washed without using chlorine-containing compounds or the polymer solution is concentrated.

24. The process as claimed in claim 23, wherein the terminator is a compound which reacts with the metallocene and/or the aluminum alkyl to give an insoluble compound.

25. The process as claimed in claim 23, wherein the terminator is water, an organic monocarboxylic acid, an organic dicarboxylic acid, an organic polycarboxylic acid, a diol or a polyol.

26. The process as claimed in claim 23, wherein the solvent is hydrated diesel fraction, decalin, toluene, cyclohexane, chlorobenzene, dichlorobenzene, chloronaphthalene or naphthalene.

27. The process as claimed in claim 23, wherein the pulverunt substance is a diatomaceous earth, a perlite, cellulose or a cellulose derivative.

28. The process as claimed in claim 23, wherein the concentration of the polymer solution is performed with the aid of a flash equipment or thin-film evaporator.

29. The process as claimed in claim 23, wherein the precipitant is alcohol, ketone or ester.

30. A process for the preparation of a fiber which comprises the steps of making the polymer according to claim 14, and spinning the polymer in a melt.

31. The process as claimed in claim 22, wherein the copolymer contains less than 100 ppm of the catalyst residue.

32. The process as claimed in claim 14, wherein the copolymer contains less than 100 ppm of the catalyst residue.

33. The process as claimed in claim 32, wherein the copolymer contains less than 100 ppm of the catalyst residue.

* * * * *